US010497177B1

(12) United States Patent
Côté et al.

(10) Patent No.: US 10,497,177 B1
(45) Date of Patent: Dec. 3, 2019

(54) TOOL FOR ONSITE AUGMENTATION OF REALITY MESHES

(71) Applicant: Bentley Systems, Incorporated, Exton, PA (US)

(72) Inventors: Stéphane Côté, Lac Beauport (CA); Maxime Ménard, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 98 days.

(21) Appl. No.: 15/709,115

(22) Filed: Sep. 19, 2017

(51) Int. Cl.
G06T 17/05 (2011.01)
G06T 19/00 (2011.01)
G06T 17/20 (2006.01)
G06F 17/50 (2006.01)

(52) U.S. Cl.
CPC ............ *G06T 19/006* (2013.01); *G06T 17/20* (2013.01); *G06T 19/003* (2013.01); *G06F 17/50* (2013.01)

(58) Field of Classification Search
CPC .... G06K 9/00671; G06T 17/05; G06T 19/006
USPC ....................................... 345/419
See application file for complete search history.

(56) References Cited

U.S. PATENT DOCUMENTS

| 6,094,625 A | 7/2000 | Ralston |
| 6,154,213 A | 11/2000 | Rennison et al. |
| 8,843,350 B2 | 9/2014 | Jacobi et al. |
| 9,536,351 B1 | 1/2017 | Côté |
| 9,646,571 B1 | 5/2017 | Côté et al. |
| 9,824,490 B1 * | 11/2017 | Cote ....................... G06T 17/05 |
| 2010/0188397 A1 | 7/2010 | Tsai et al. |
| 2011/0066375 A1 | 3/2011 | France et al. |

OTHER PUBLICATIONS

"ContextCapture," User Guide, Bentley Systems, Incorporated, Dec. 1, 2016, pp. 1-238.
Duinat, Benoit, "Situated Simulation: An Attractive Alternative to Mobile Augmented Reality in Urban Environments," IEEE International Symposium on Mixed and Augmented Reality (ISMAR) Workshop on Challenges and Applications of Urban Augmented Reality, Fukuoka, Japan, Oct. 2015, pp. 1-2.
Duinat, Benoit, "Urban Situated Simulation Interface: Design & Development of a Tablet-Based Solution," ASPRS 2013 Annual Conference, Baltimore, Maryland, Mar. 24-28, 2013, pp. 1-12.

(Continued)

*Primary Examiner* — Thomas J Lett
(74) *Attorney, Agent, or Firm* — Cesari and McKenna, LLP; James A. Blanchette (57) ABSTRACT

In one embodiment, augmented reality is simulated by augmenting a pre-generated, physical environment-aligned 3D reality mesh. A camera system captures digital images of a site. A backend processing system generates a 3D reality mesh of the site based on the digital images, assigns metadata to infrastructure elements in the 3D reality mesh, and stores the 3D reality mesh and metadata. At a subsequent time, a mobile device accesses the 3D reality mesh and assigned metadata. A positioning sensor determines a live position of the mobile device. An orientation sensor determines a live orientation of the mobile device. Based on the live position and live orientation, a view of the 3D reality mesh aligned to the physical environment is produced and displayed on a display device of the mobile device. That view is then augmented based on the assigned metadata.

26 Claims, 7 Drawing Sheets

(56) References Cited

OTHER PUBLICATIONS

Izkara, Jose Luis, et al., "Mobile Augmented Reality, and Advanced Tool for the Construction Sector," Oct. 16, 2014, pp. 1-12.
Pouliot, Jacynthe, et al., "3D Cadastre Visualization: Recent Progress and Future Directions," 5$^{th}$ International FIG 3D Cadastre Workshop, Athens, Greece, Oct. 18-20, 2016, pp. 337-360.
Schall, Gerhard, et al., "Handheld Augmented Reality for Underground Infrastructure Visualization," Journal of Personal and Ubiquitous Computing, Springer-Verlag, vol. 13, Issue 4, May 2009, pp. 1-17.
U.S. Appl. No. 15/091,796, filed Apr. 6, 2016 by Stéphane Côté et al. for Tool for Accurate Onsite Model Visualization That Facilitates Environment Interaction, pp. 1-29.
U.S. Appl. No. 15/485,207, filed Apr. 11, 2017 by Stéphane Côté et al. for On-Site Visualization and Modeling Using P&ID Drawings and Augmented Reality, pp. 1-38.
U.S. Appl. No. 15/700,742, filed Sep. 11, 2017 by Stéphane Côté for Tool for Onsite Augmentation of Past Events, pp. 1-29.

\* cited by examiner

TOOL FOR ONSITE AUGMENTATION OF REALITY MESHES

BACKGROUND

Technical Field

The present disclosure relates to augmented reality, and more specifically, to techniques for simulating augmented reality using a pre-generated three dimensional (3D) reality mesh.

Background Information

Augmented reality has enormous potential for conveying data useful in infrastructure design and maintenance. While augmented reality has applicability to a wide variety of different types of infrastructure, one type it may be applied to is municipal assets (e.g., subsurface utilities, poles, hydrants, street lights, and other assets owned or managed by a municipality). Over the years, municipalities may accumulate enormous quantities of data related to municipal assets, such as pipe and other utility drawings and maps, two-dimensional (2D) or three-dimensional (3D) computer aided design (CAD) models, asset specifications, installation dates and maintenance schedules, inspection reports, repair documents, photos, videos, etc. While such data has traditionally been diligently maintained, it has been difficult to access when relevant to a current task, for example, by engineers, workers or other users at a site. As a result, users have often ignored preexisting data, instead capturing new data to suit their present needs.

Augmented reality has the potential to decrease this sort of inefficiency, by allowing users an efficient and intuitive interface for accessing preexisting data. In a model augmented reality system, a user may use a camera of a mobile device to capture a live view of the site (a live scene). This live scene is then augmented to include relevant data regarding infrastructure elements. Such an augmented reality display may render large quantities of data accessible to a user, providing them with the data that is relevant to their surrounding environment.

However, while extensive research has been devoted to augmented reality systems, developing a system that is robust enough for widespread adoption in the infrastructure design and maintenance space has proved elusive. Augmented reality systems continue to be hindered by several technical challenges. First, camera tracking poses an ongoing challenge. In order to augment a live scene, an accurate measurement is required of the position of the camera which captured the live scene. If there is error or uncertainty in the position of the camera, the quality of the augmented reality is greatly diminished. Augmentations may appear in incorrect locations, such that a user cannot rely on them in their decision making. Further, augmentations may appear to "jitter" about as camera tracking struggles to determine the correct position, causing visual distractions that may hinder usability. The challenge of camera tracking is particularly acute in outdoor environments, in part due to changing illumination conditions (e.g., due to time of day), changing weather conditions, dynamically changing environmental features (e.g., cars and pedestrians moving on a street), and potential interference with positioning system signals (e.g., global positioning system (GPS) satellite signals blocked by tall buildings), which may hinder the operation of traditional camera tracking algorithms. Traditional camera tracking algorithms for augmenting a live scene may fail entirely under certain conditions, for example, at night or during the winter when environmental features are hidden by snow cover. The challenges of camera tracking also impose significant hardware requirements. Traditional camera tracking algorithms are extremely computationally intensive, consuming significant central processing unit (CPU) and memory resources. As such, they may be poorly suited for implementation on low-power mobile devices.

Second, measurement of topography in a live scene poses an ongoing challenge. Accurate topography information may be required for certain types of augmentations, for use in projection and occlusion management. However, obtaining accurate topography information over large areas (e.g., road surfaces) via live capture may be challenging, especially in outdoor environments. Existing portable live 3D scanning devices are very expensive, and may not provide the required level of accuracy over large distances. Until such devices become affordable and appropriate for typical use cases, augmentation generally requires a specially produced 3D CAD model of the environment to enable correct renderings, which may be burdensome.

For at least these and other reasons, there is a need for new ways of conveying infrastructure data to a user at a site, which may provide many of the same benefits as augmented reality, but avoid at least some of the technical challenges associated with use of a live scene.

SUMMARY

In one embodiment, augmented reality is simulated by augmenting a pre-generated, physical environment-aligned 3D reality mesh. A 3D reality mesh is generated in advance based on digital images and/or point clouds of a site. Metadata regarding infrastructure elements is assigned to the 3D reality mesh. Subsequently, the 3D reality mesh and metadata is accessed by a mobile device. A live position and live orientation of the mobile device is determined, and based thereon, a view of the pre-generated 3D reality mesh aligned to the physical environment is displayed on mobile device, such that what the users sees in the 3D reality mesh corresponds to what they see in the physical environment. While not live, the view approximates a live scene. Augmentations are discs played in the pre-generated, physical environment-aligned 3D reality mesh based on the assigned metadata. In such manner, augmented reality is simulated, but the challenges of camera tracking may be avoided. Likewise, the need for live scene depth measurements may also be avoided.

In one specific implementation, augmented reality is simulated by augmenting a pre-generated, physical environment-aligned 3D reality mesh. A camera system captures digital images of a site. A backend processing system generates a 3D reality mesh of the site based on the digital images, assigns metadata to infrastructure elements in the 3D reality mesh, and stores the 3D reality mesh and metadata. At a subsequent time, a mobile device accesses the 3D reality mesh and assigned metadata. A positioning sensor determines a live position of the mobile device. An orientation sensor determines a live orientation of the mobile device. Based on the live position and live orientation, a view of the 3D reality mesh aligned to the physical environment is produced and displayed on a display device of the mobile device. That view is then augmented based on the assigned metadata.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings, of which.

DETAILED DESCRIPTION

Figure 1:
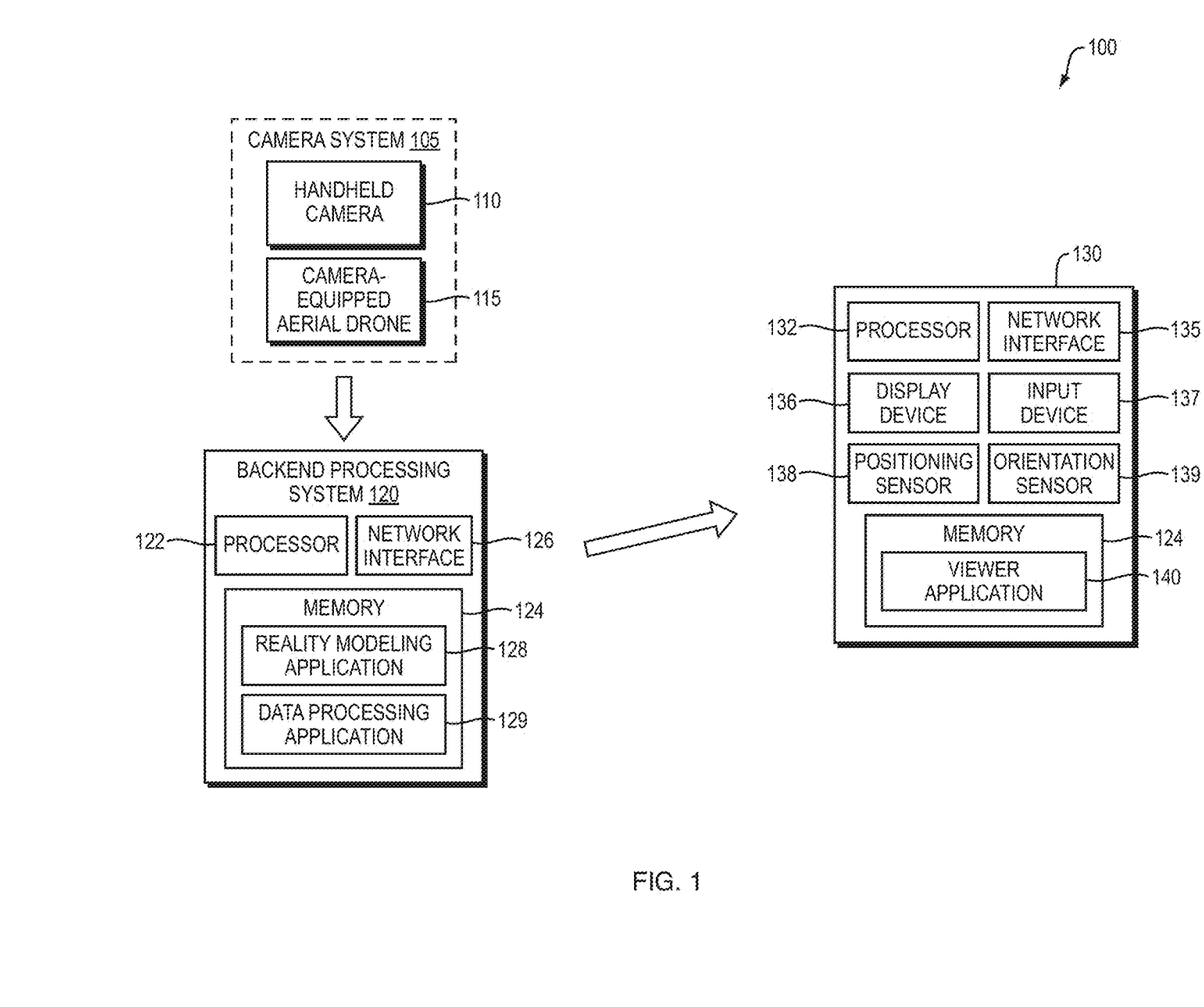
FIG. 1 is a diagram of an example system for simulating augmented reality by augmenting a pre-generated, physical environment-aligned reality mesh.

FIG. 1 is a diagram of an example system 100 for simulating augmented reality by augmenting a pre-generated, physical environment-aligned reality mesh. The system includes a camera system 105, including a handheld camera 110 (e.g., a handheld digital single-lens reflex (DSLR) camera) and/or a camera-equipped aerial drone 115, for capturing a large number of digital images (i.e. photographs) of a site. The camera system may also potentially include a laser scanner or time of flight camera (not shown) for capturing point clouds of the site.

The digital images (and potentially point clouds) of the site are transferred to a backend processing system (e.g., a desktop computer, a cloud-based server, etc.). The backend processing system 120 includes at least a processor 122 and a memory 124 that stores software for execution on the processor, and a network interface 126. Among other software, the memory 124 may store a reality modeling software application 128 and a data processing software application 129. The reality modeling software application 128, when executed, may receive the digital images (and potentially point clouds) of the site and generate a 3D reality mesh of the site therefrom. In one implementation, the reality modeling software application is the ContextCapture™ application commercially available from Bentley Systems, Inc., which is capable of automatically generating a 3D reality mesh from up to 300 gigapixels of supplied digital images and and/or 500 million points of supplied point clouds. The data processing application 129, when executed, may access the generated 3D reality mesh for the site, and assign metadata (e.g., georeferences, data "tags", scaled and aligned 2D maps, etc.) to infrastructure elements in the mesh. Such assignment may be performed manually in response to user-input, or at least partially automated. The data processing application 129 may also configure how such metadata should be displayed via augmentations, for example, configure the types of visual indicators that should be used to indicate augmentations are available, trigger conditions for displaying visual indicators and/or augmentations, and types of augmentations that should be used with different types of metadata. Such configuration may be performed manually in response to user-input, or at least partially automated. In one implementation the data processing application 129 is the Bentley Map™ application commercially available from Bentley Systems, Inc. The metadata and configuration information may be stored together with the 3D reality mesh.

The 3D reality mesh and assigned metadata and configuration information may be accessed by (e.g., transferred to) a mobile device 130 (e.g., a tablet computer, such as the Tango® augmented-reality enabled tablet available from Google Inc., a head-mounted display unit, such as the HoloLens® head-mounted display unit available from Microsoft Corp., a smartphone, or another type of portable electronic device capable of at least simulating augmented reality). The mobile device 130 includes at least a processor 132 and a memory 124 that stores software for execution on the processor, a network interface 135, a display device 136 (e.g., a touch screen panel, a stereoscopic optical see-through head-mounted display, etc.), an input device 137 (e.g., a touch sensor, a sensor for detecting hand gestures, a thumb-sized finger-operated "clicker", a microphone for detecting voice commands, etc.), a positioning sensor 138 (e.g., a global positioning system (GPS) receiver, a Wi-Fi positioning (WPS) functional unit, etc.) configured to determine a live position of the mobile device 130 and an orientation sensor (e.g., accelerometer, gyro sensor, etc.) 139 configured to determine a live orientation of the mobile device 130. Among other software, the memory 134 may store a viewer application 140. The viewer application 140, when executed, may receive the previously generated 3D reality mesh with metadata and configuration information, along with the live position and live orientation of the augmented reality device 130 from the positioning sensor 138 and the orientation sensor 139, respectively.

The viewer application 140 may provide a user interface for adjusting the live position and live orientation to permit correction of errors. Based on the possibly adjusted live position and live orientation, the viewer application 140 displays a view of the 3D reality mesh aligned to the physical environment. The view may be from a virtual camera that is placed in the 3D reality mesh at the live position and live orientation, such that what the users sees in the 3D reality mesh corresponds to what they see in the physical environment. The viewer application 140 (e.g., in response to user input) augments the displayed view based on the assigned metadata and configuration information (e.g., to show 3D windows, 2D map overlays, 3D CAD objects, etc.). In some implementations, the viewer application 140 further allows for adjusting the live position and live orientation to decouple these quantities from the actual position and orientation of the mobile device, 130, to permit generation of a third person view. In one implementation, the viewer application 140 is the Bentley Map Mobile™ application commercially available from Bentley Systems, Inc.

Figure 2:
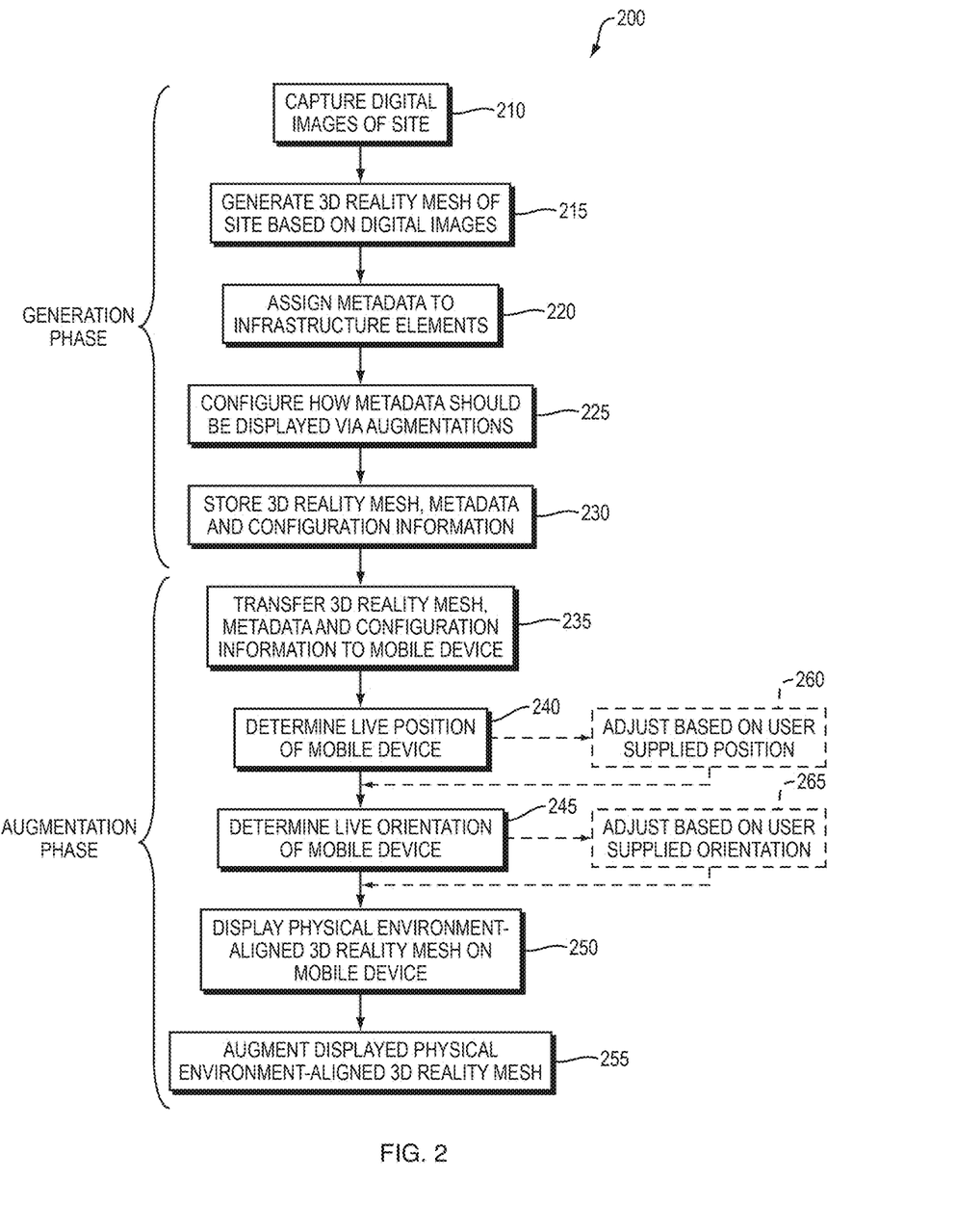
FIG. 2 is a flow diagram of an example sequence of steps for simulating augmented reality by augmenting a pre-generated, physical environment-aligned reality mesh.
Figure 3A:
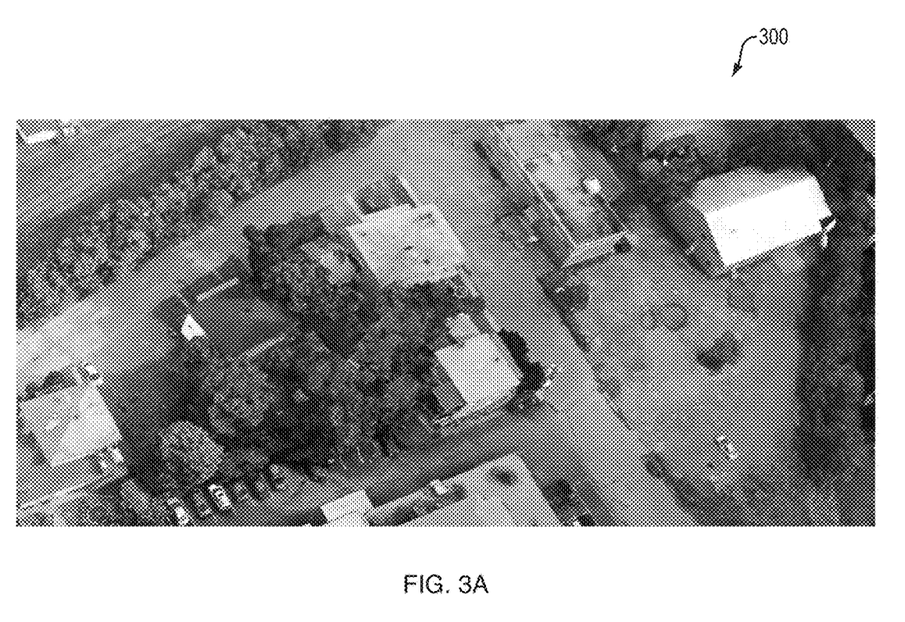
FIG. 3A is an overhead view of an example 3D reality mesh showing a street and several buildings.
Figure 3B:
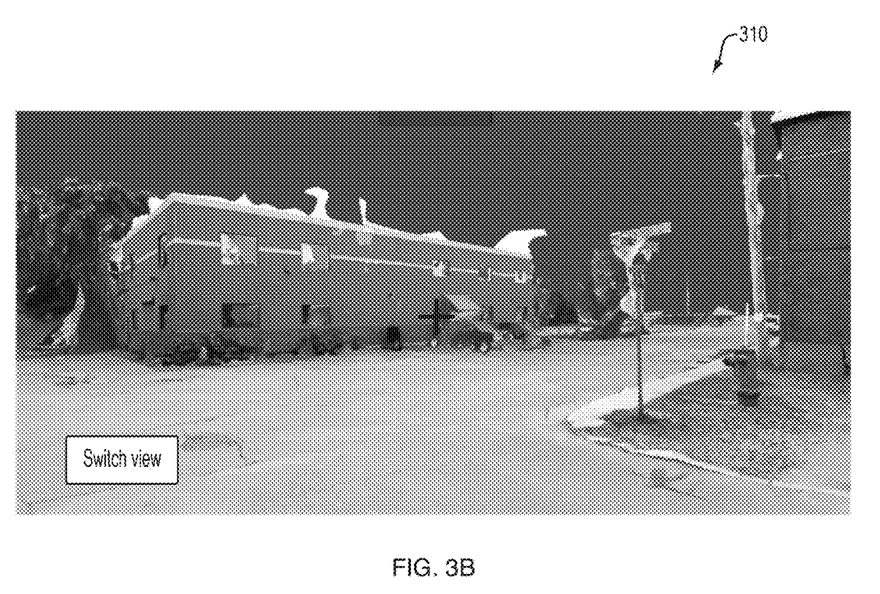
FIG. 3B is a perspective view of the same example 3D reality mesh of FIG. 3A, showing a particular building.

FIG. 2 is a flow diagram of an example sequence of steps 200 for simulating augmented reality by augmenting a pre-generated, physical environment-aligned reality mesh. At step 210, the camera system 105 captures a large number of digital images (and possibly point clouds) of a site. At step 215, the reality modeling software application 128 executing on the backend processing system 120, generates a 3D reality mesh of the site based on the digital images (and potentially point clouds). FIG. 3A is an overhead view 300 of an example 3D reality mesh showing a street and several buildings, which may be generated as part of step 215. FIG. 3B is a perspective view 310 of the same example 3D reality mesh of FIG. 3A, showing a particular building. At step 220, the data processing application 129 executing on the backend processing system 120 (e.g., manually in response to user input, automatically in response to predetermined rules, etc.) assigns metadata (e.g., georeferences, data "tags", scaled and aligned 2D maps, etc.) to infrastructure elements in the 3D reality mesh. At step, 225, the data processing application 129 configures (e.g., manually in response to user input, automatically in response to predetermined rules, etc.) how such metadata should be displayed via augmentations. As part of step 225, the data processing application 129 may assign visual indicators to infrastructure elements that, when displayed, convey that augmentations with data are available. The visual indicators may take a number of different forms. For example, in one implementation, individual infrastructure elements are configured to be highlighted in the 3D reality mesh to indicate that an augmentation with data related to them is available. Alternatively, a special symbol may be shown nearby the individual infrastructure elements in the 3D reality mesh to indicate that an augmentation with data related to them is available. As part of step 225, the data processing application 129 may also assign trigger conditions for the display of visual indicators and/or augmentations. For example, a trigger condition may be proximity of a mobile device 130 to an infrastructure element in the physical environment, such that a visual indicator and/or augmentation is displayed in the 3D reality mesh when the mobile device 130 is within a certain threshold distance. Further, as part of step 225, the data processing application 129 may configure types of augmentations that should be used with different type of metadata. Different types of augmentations may be more or less suited for different types of metadata. For example, a 3D window imposed in the 3D reality mesh, or separate from the 3D reality mesh, may be well suited for textual metadata (e.g., asset specifications, installation dates and maintenance schedules, inspection reports, repair documents, etc.) among other types of metadata. Further, 3D CAD objects imposed in the 3D reality mesh, or a 2D map projected on a surface of the 3D reality mesh, may be well suited for physical metadata (e.g., pipe and other utility locations from drawings and maps, planned new construction from 2D or 3D CAD models, etc.). In some cases, combinations of multiple types of augmentations may be best suited for the available metadata, for example, 3D CAD objects imposed in the 3D reality mesh about an infrastructure element to represent menu items for choosing data, and then 3D windows or separate windows to display the chosen data. It should be understood that a wide variety of different types of augmentations may be configured for use with different types of metadata. In some embodiments, the data processing application 129 may pre-generate some or all of certain types of augmentations (e.g., projecting 2D maps upon surfaces). This may remove some burdens from the viewer application 140 executing on the mobile device 130. Such pre-generated augmentations may be stored as part of the metadata.

At step 230, the metadata and configuration information is stored with the 3D reality mesh on the backend processing system 120 until needed. Sometime subsequent to generation of the 3D reality mesh, a user may desire to access information about infrastructure elements while onsite. At step 235, the 3D reality mesh, metadata and configuration information is accessed by (e.g., transferred over a network to) the mobile device 130. A transfer may be performed prior to the mobile device 130 being brought to the site (e.g., preloading) or on demand while the user and mobile device 130 are at the site (e.g., in response to a user request for an augmented view).

Figure 4:
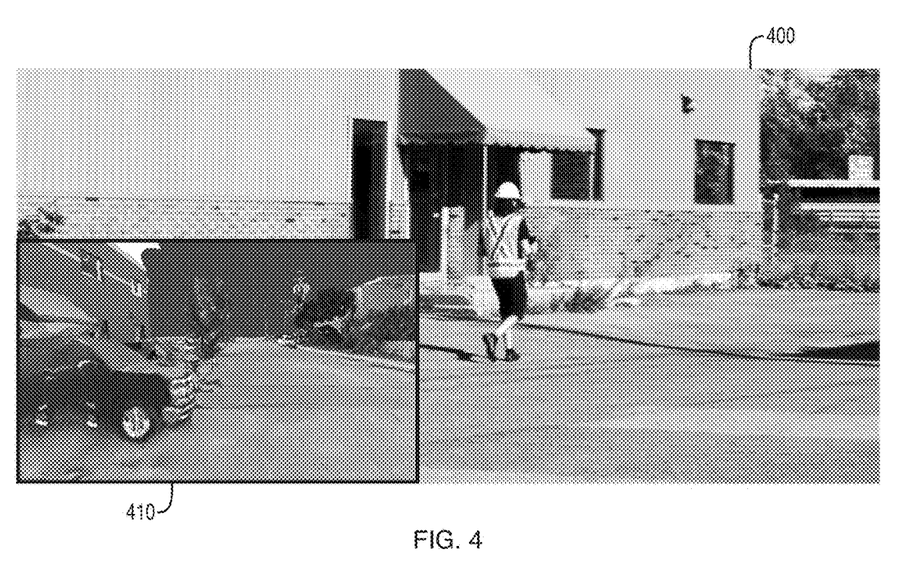
FIG. 4 is an illustration of a user viewing a portion of the physical environment, and an insert showing a view of a physical environment-aligned 3D reality mesh that corresponds with what the user sees in the physical environment.

At step 240, the positioning sensor 138 of the mobile device 130 determines a live position of the mobile device. At step 245, the orientation sensor 139 of the mobile device 130 determines a live orientation of the mobile device. At step 250, based on the live position and live orientation, the viewer application 140 executing on the mobile device 130 displays on the display device 136 a view of the previously generated 3D reality mesh aligned to the physical environment. The view may be from a virtual camera that is placed in the 3D reality mesh at the live position and live orientation, such that what the users sees in the 3D reality mesh corresponds to what they see in the physical environment. FIG. 4 is an illustration 400 of a user viewing a portion of the physical environment, and an insert 410 showing a view of a physical environment-aligned 3D reality mesh that corresponds with what the user sees in the physical environment. The insert 410 may be what is shown on the display device 136 of the mobile device 130.

At step 255, the viewer application 140 augments the displayed view of the physical environment-aligned 3D reality mesh, based on the assigned metadata and configuration information. Augmentation processing may be performed on the mobile device 130, or alternatively, at least partially on the backend processing system 120, as discussed above.

Figure 5:
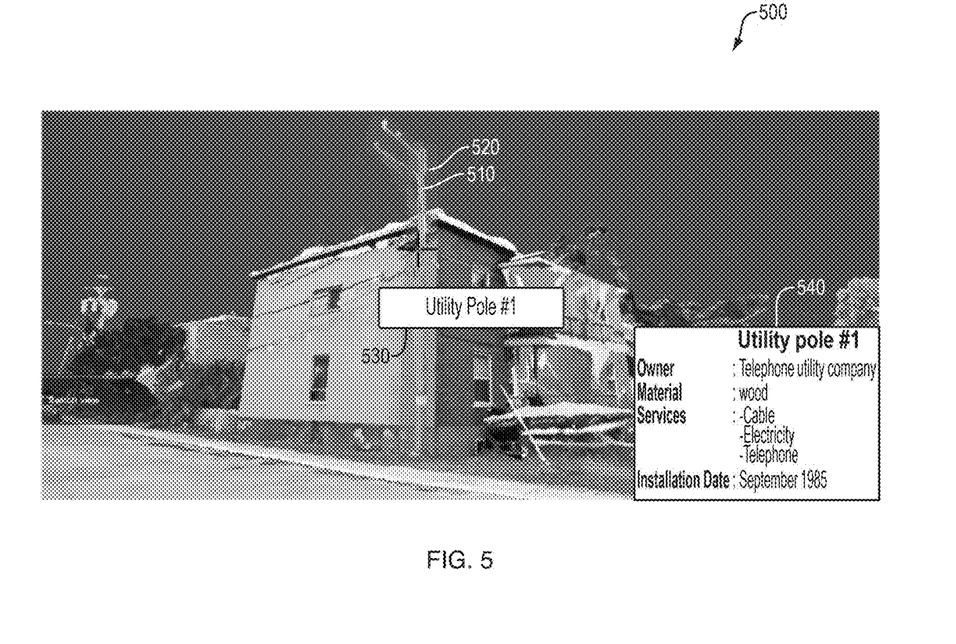
FIG. 5 is a view of an example augmented physical environment-aligned 3D reality mesh that may be shown on a display device of a mobile device, in which a selected infrastructure element (here, a utility pole) is highlighted, and a 3D window with data (here, a utility pole number) corresponding to the selected infrastructure element is imposed nearby in the 3D reality mesh.

Based on the types of visual indicators, trigger conditions, and types of augmentations indicated in the configuration information, a wide variety of augmentations may be shown. For example, a 3D window may be imposed in the 3D reality mesh, together with highlighting of a corresponding infrastructure element. FIG. 5 is a view 500 of an example augmented physical environment-aligned 3D reality mesh that may be shown on the display device 136 of the mobile device 130, in which a selected infrastructure element (here, a utility pole) 510 is highlighted 520, and a 3D window 530 with data (here, a utility pole number) corresponding to the selected infrastructure element is imposed nearby in the 3D reality mesh and a separate window 540 with data (here, owner, material, services, etc.) is displayed in the corner on the display device 136. Such a view may be displayed as a part of the following example workflow. The user may identify an infrastructure element (here, the utility pole) in the physical environment they desire more information regarding, and orientate the mobile device 130 to point towards the infrastructure element. Based on the configuration information for the 3D reality mesh, the viewer application 140 may highlight the infrastructure element (here, the utility pole) in the 3D reality mesh, to indicate that an augmentation with data is available. The user may see the correspondence between the infrastructure element in the physical environment they desire information about and the highlighted infrastructure element (here, the utility pole) in the 3D reality mesh, and select (e.g., "click" on) the highlighted infrastructure element (here, the utility pole) in the 3D reality mesh, for example, using an input device 137. In response, the viewer application 140 imposes the 3D window 530 with data (here, the utility pole number) nearby the selected infrastructure element in the 3D reality mesh. The user may make a further selection (e.g., "click" somewhere else in the 3D reality mesh) to hide the 3D window 530. In an alternative implementation, rather than impose a 3D window 530 in the 3D reality mesh, a window may be displayed separate from the 3D reality mesh, on another portion of the display device 136.

Figure 6:
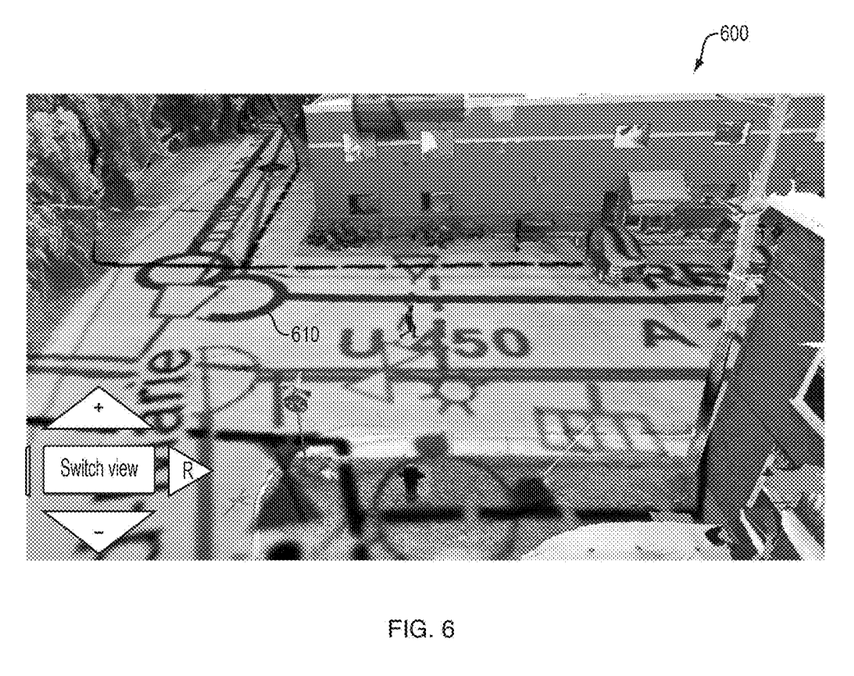
FIG. 6 is a view of an example augmented physical environment-aligned 3D reality mesh that may be shown on a display device of a mobile device, in which a 2D map (here, of subsurface utilities) is projected upon a surface (here, the ground) in the 3D reality mesh.

In another example, a 2D map may be projected upon a surface in the 3D reality mesh. FIG. 6 is a view 600 of an example augmented physical environment-aligned 3D reality mesh that may be shown on the display device 136 of the mobile device 130, in which a 2D map (here, of subsurface utilities) 610 is projected upon a surface (here, the ground) in the 3D reality mesh. Such a view may be displayed to the user as a part of the following example workflow. The user may identify an area in the physical environment they desire more information regarding and orientate the mobile device 130 to point towards that area. Based on the configuration information for the 3D reality mesh, the viewer application 140 may display an option for enabling projection of data (here, of subsurface utilities). The user may select (e.g., "click" on) the option, for example, using an input device 137. In response, the viewer application 140 projects (here, vertically) a 2D map (here, showing the subsurface utilities) upon a surface (here, the ground). Alternatively, a pre-generated projection produced by the processing system 120 (e.g., stored as one or more layers) may be accessed and displayed.

In general, the 2D map itself may include multiple layers (e.g., for different types of utilities, such as gas pipes, sewer pipes, electrical, etc.), which may be individually selected for display in response to further input using the input device 137. The user may make a further selection (e.g., deselect all layers) to hide the 2D map. In an alternative implementation, rather than project a 2D map, 3D CAD objects may be imposed in the 3D reality mesh. In some cases, a portion of the 3D reality mesh may be cut away (e.g., as a virtual excavation) to reveal 3D CAD objects where they would be obscured by the 3D reality mesh.

One issue that may arise is that the live position of the mobile device 130 deters mined by the positioning sensor 138 is not accurate. At optional step 260, the viewer application 140 adjusts the live position to use a user-supplied position, rather than the one determined by the positioning sensor 138, to permit correction of errors. The user-supplied live position may be received in a user interface of the viewer application 140. For example, the user may walk to a position in the physical environment. The user may manually adjust the position of the virtual camera (e.g., by selecting a "position adjust" button and scrolling in the 3D reality mesh) from the position determined by the positioning sensor 138 to a new position that appears to visually correspond to their position in the physical environment (i.e. "detaching" the virtual camera from the position determined by the positioning sensor 138). The user may cease virtual camera adjustment when the virtual camera appears to be in a corresponding position (e.g., by deselecting the "position adjust" button).

Further, another issue that may arise is that the live orientation of the mobile device 130 determined by the orientation sensor 139 is not accurate. At optional step 265, the viewer application 140 adjusts the live orientation to use a user-supplied orientation, rather than the one determined by the orientation sensor 139, to permit correction of errors. The user-supplied live orientation may be received in a user interface of the viewer application 140. For example, the user may walk to a position in the physical environment and point the mobile device 130 towards an element in the physical environment. The user may manually adjust the orientation of the virtual camera (e.g., by selecting a "compass adjust" button and rotating the 3D reality mesh) from the orientation determined by the orientation sensor 139 to a new orientation that appears to visually correspond to their view of the element in the physical environment (i.e. "detaching" the virtual camera from the orientation determined by the orientation sensor 139). The user may cease virtual camera adjustment when the virtual camera appears to be in a corresponding orientation (e.g., by deselecting the "camera adjust" button).

In an alternative embodiment (not shown in FIG. 2), errors in the live orientation from the orientation sensor 139 may be corrected by a calibration procedure, rather than by replacement with user-supplied orientation. In an example calibration procedure, orientation is calibrated based on an angle between two positions determined by the positioning sensor 138. For example, the user may walk to a first position in the physical environment, and select a second position they can walk to in a straight line. The user may activate orientation calibration in a user interface of the viewer application 140 (e.g., by selecting a "compass adjust" button), which causes the first position to be recorded. The user then walks in a straight line to the second position and deactivates orientation calibration in the user interface of the viewer application 140 (e.g., by deselecting a "compass adjust" button), which causes the second position to be recorded. The viewer application calibrates the orientation sensor 139 based on the angle between the two recorded locations.

Further, in some cases (not shown in FIG. 2), the live position and live orientation may be decoupled from the actual position and orientation of the mobile device, 130, to permit generation of a third person view. Rather than merely attempt to correct errors in position and orientation, decoupling for a third person view involves changes to entirely different positions and orientations, such that the user can see different perspectives without actually moving about the physical environment. For example, the user may manually adjust the position and orientation of the virtual camera (e.g., by selecting a "third person view" button and scrolling and rotating the 3D reality mesh), decoupling it from the position and orientation determined by the position sensor 138 and the orientation sensor 139. The user may view different areas and trigger augmentations of infrastructure elements in those areas. The user may eventually cease third person viewing (e.g., by deselecting the "third person view" button), and the live position and live orientation may be recoupled to the position and orientation determined by the position sensor 138 and the orientation sensor 139.

In summary, while the above description discusses example techniques for simulating augmented reality by augmenting a pre-generated, physical environment-aligned 3D reality mesh, it should be understood that a number of modifications and additions may be made without departing from the disclosure's intended spirit and scope. Further, it should be understood that the above discussed techniques may be implemented in software, in hardware, or in a combination thereof. A software implementation may include electronic device-executable instructions stored in a non-transitory electronic devices readable medium, such as a volatile or persistent memory, a hard-disk, a compact disk (CD), or other storage medium. A hardware implementation may include specially configured processors, application specific integrated circuits (ASICs), and other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. A method for simulating augmented reality by augmenting a pre-generated, physical environment-aligned three dimensional (3D) reality mesh, comprising:
   capturing, by a camera system, digital images of a site;
   generating a 3D reality mesh of the site based on the digital images;
   assigning metadata to infrastructure elements in the 3D reality mesh;
   at a time subsequent to the generating and assigning, accessing the 3D reality mesh and assigned metadata on a mobile device;
   determining, by a position sensor, a live position of the mobile device;
   determining, by an orientation sensor, a live orientation of the mobile device;
   based on the live position and live orientation, displaying on a display device of the mobile device, a view of the 3D reality mesh aligned to the physical environment; and
   augmenting the displayed view of the physical environment-aligned 3D reality mesh based on the assigned metadata.

2. The method of claim 1, further comprising:
   generating configuration information describing how metadata should be displayed via augmentations; and
   at the time subsequent to the generating and assigning, accessing the configuration information on the mobile device.

3. The method of claim 1, further comprising:
   adjusting the live position based on a user supplied position to correct errors in position determined by the positioning sensor.

4. The method of claim 1, further comprising:
   adjusting the live orientation based on a user supplied orientation to correct errors in orientation determined by the orientation sensor.

5. The method of claim 1, further comprising
   decoupling the live position and live orientation from an actual position and orientation of the mobile device, to generate a third person view.

6. The method of claim 1, wherein the augmenting further comprises:
   highlighting infrastructure elements in the 3D reality mesh to indicate that augmentations with data are available for the infrastructure elements upon selection.

7. The method of claim 1, wherein the augmenting further comprises:
   imposing a 3D window with data nearby a selected infrastructure element in the 3D reality mesh.

8. The method of claim 1, wherein the augmenting further comprises:
   projecting a two dimensional (2D) map upon a surface in the 3D reality mesh.

9. The method of claim 1, wherein the generating and the assigning are performed by a backend processing system that stores the 3D reality mesh and assigned metadata until accessed by the mobile device.

10. The method of claim 1, wherein the mobile device is a tablet computer.

11. The method of claim 1, further comprising:
    capturing, by a laser scanner, point clouds of the site,
    wherein the generating the 3D reality mesh of the site is further based on the point clouds.

12. A system for simulating augmented reality by augmenting a pre-generated, physical environment-aligned three dimensional (3D) reality mesh, comprising:
    a camera system configured to capture digital images of a site;
    a backend processing system configured to receive the digital images and execute a reality modeling application that generates a 3D reality mesh of the site based on the digital images, and execute a data processing application that assigns metadata to infrastructure elements in the 3D reality mesh; and
    a mobile device configured to access the 3D reality mesh and assigned metadata, and execute a viewer application that, based on a live position and live orientation of the mobile device, displays a view of the 3D reality mesh aligned to the physical environment, and augments the displayed view of the physical environment-aligned 3D reality mesh based on the assigned metadata.

13. The system of claim 12, wherein the data processing application further generates configuration information describing how metadata should be displayed via augmentations.

14. The system of claim 12, wherein the viewer application further adjusts the live position based on a user supplied position to correct errors in position.

15. The system of claim 12, wherein the viewer application further adjusts the live orientation based on a user supplied orientation to correct errors in orientation.

16. The system of claim 12, wherein the mobile device is a tablet computer.

17. A non-transitory electronic device-readable medium that includes instructions executable on one or more electronic-devices that, when executed, are operable to:
    at a first time,
      generate a three-dimensional (3D) reality mesh of a site,
      assign metadata to infrastructure elements in the 3D reality mesh,
      store the 3D reality mesh and the metadata until a subsequent time; and
    at the subsequent time,
      determine a live position,
      determine a live orientation,
      based on the live position and live orientation, display a view of the 3D reality mesh aligned to the physical environment, and
      augment the displayed view of the physical environment-aligned 3D reality mesh based on the assigned metadata.

18. The non-transitory electronic device-readable medium of claim 17, wherein the instructions, when executed, are further operable to:
    at the subsequent time, adjust the live position based on a user supplied position to correct errors in position.

19. The non-transitory electronic device-readable medium of claim 17, wherein the instructions, when executed, are further operable to:

adjust the live orientation based on a user supplied orientation to correct errors in orientation.

20. The non-transitory electronic device-readable medium of claim 17, wherein the instructions, when executed, are further operable to:

decouple the live position and live orientation from an actual position and orientation to generate a third person view.

21. A method for simulating augmented reality by augmenting a pre-generated, physical environment-aligned mesh, comprising:

accessing, on a mobile device, a pre-generated mesh that represents a site having one or more infrastructure elements, and metadata assigned to the infrastructure elements;

determining a live position of the mobile device;

determining a live orientation of the mobile device;

based on the live position and live orientation, displaying on a display device of the mobile device, a view of the mesh aligned to the physical environment; and augmenting the displayed view of the physical environment-aligned mesh based on the assigned metadata.

22. The method of claim 21, further comprising:

capturing, by a camera system, digital images of the site;

generating the mesh that represents the site based on the digital images; and assigning metadata to infrastructure elements in the mesh.

23. The method of claim 21, further comprising:

generating configuration information describing how metadata should be displayed via augmentations; and accessing the configuration information on the mobile device.

24. The method of claim 21, wherein the determining the live position is performed by a positioning sensor of the mobile device, and the method further comprises:

adjusting the live position based on a user supplied position to correct errors in position determined by the positioning sensor.

25. The method of claim 21, wherein the determining the live orientation is performed by an orientation sensor of the mobile device, and the method further comprises:

adjusting the live orientation based on a user supplied orientation to correct errors in orientation determined by the orientation sensor.

26. The method of claim 21, further comprising decoupling the live position and live orientation from an actual position and orientation of the mobile device, to generate a third person view.

* * * * *

UNITED STATES PATENT AND TRADEMARK OFFICE
CERTIFICATE OF CORRECTION

PATENT NO. : 10,497,177 B1
APPLICATION NO. : 15/709115
DATED : December 3, 2019
INVENTOR(S) : Stéphane Côté et al.

Page 1 of 1

It is certified that error appears in the above-identified patent and that said Letters Patent is hereby corrected as shown below:

In the Specification

Column 2, Line 43 reads:
"mentations are discs played in the pre-generated, physical"
Should read:
--mentations are displayed in the pre-generated, physical--

Column 7, Line 45 reads:
"mobile device 130 deters mined by the positioning sensor"
Should read:
--mobile device 130 determined by the positioning sensor--

Column 8, Line 66 reads:
"non-transitory electronic devices readable medium, such as"
Should read:
--non-transitory electronic device-readable medium, such as--

Signed and Sealed this
Thirty-first Day of March, 2020

Andrei Iancu
*Director of the United States Patent and Trademark Office*